(12) United States Patent
Buscaglia et al.

(10) Patent No.: US 7,565,170 B2
(45) Date of Patent: Jul. 21, 2009

(54) RADIO BASE STATION RECEIVER HAVING DIGITAL FILTERING AND REDUCED SAMPLING FREQUENCY

(75) Inventors: Flavio Buscaglia, Turin (IT); Valerio Bernasconi, Turin (IT)

(73) Assignee: Telecom Italia S.p.A., Milan (IT)

( * ) Notice: Subject to any disclaimer, the term of this patent is extended or adjusted under 35 U.S.C. 154(b) by 614 days.

(21) Appl. No.: 10/540,530

(22) PCT Filed: Dec. 24, 2002

(86) PCT No.: PCT/IB02/05613

§ 371 (c)(1),
(2), (4) Date: Jan. 23, 2006

(87) PCT Pub. No.: WO2004/059934

PCT Pub. Date: Jul. 15, 2004

(65) Prior Publication Data

US 2006/0121944 A1 Jun. 8, 2006

(51) Int. Cl.
*H04M 1/00* (2006.01)
(52) U.S. Cl. .................. 455/561; 455/553.1; 455/77; 455/81; 398/116; 375/346
(58) Field of Classification Search ........... 455/561, 455/553.1, 77, 80, 81, 84, 86, 127.1, 147, 455/226.2, 444; 398/116; 375/346
See application file for complete search history.

(56) References Cited

U.S. PATENT DOCUMENTS 4,736,163 A * 4/1988 Berkhout et al. ............. 327/58

5,504,455 A 4/1996 Inkol
(Continued)

FOREIGN PATENT DOCUMENTS

EP 0 714 218 A1 5/1996
(Continued)

OTHER PUBLICATIONS

Atsuya, Y., "Optical Transmission Repeater and Repeating System Using Same," Patent Abstracts of Japan, JP. No. 2001197012, Jul. 19, 2001.
(Continued)

*Primary Examiner*—Matthew D Anderson
*Assistant Examiner*—Shaima Q Aminzay
(74) *Attorney, Agent, or Firm*—Finnegan, Henderson, Farabow, Garrett & Dunner, L.L.P.

(57) ABSTRACT

A station for processing a first signal which can be generated by a mobile terminal and belongs to a plurality of signals for mobile radio communications networks. The stations include an input able to receive from an antenna the first signal associated with a first band and at least one adjacent signal of said plurality associated with a second band adjacent to that of the first signal; a processing stage for generating from the first digital signal at a first sampling frequency, this first digital signal including a useful spectral content of the first signal and an interfering spectral content associated with the adjacent signal; a digital filter for processing the first digital signal, attenuating the interfering spectral content, and for providing a filtered digital signal including at least part of the useful special content sampled at a second sampling frequency less than the first sampling frequency and an electro-optical converter for generating from the filtered digital signal electromagnetic radiation to be transmitted on a waveguide.

24 Claims, 7 Drawing Sheets

U.S. PATENT DOCUMENTS

| | | | |
|---|---|---|---|
| 5,642,405 A | 6/1997 | Fischer et al. | |
| 5,682,256 A | 10/1997 | Motley et al. | |
| 6,243,430 B1 | 6/2001 | Mathe | |
| 2002/0003645 A1 | 1/2002 | Kim et al. | |
| 2004/0176058 A1* | 9/2004 | Johnson | 455/147 |
| 2005/0210092 A1* | 9/2005 | Ferguson | 708/300 |

FOREIGN PATENT DOCUMENTS

| | | | |
|---|---|---|---|
| EP | 1 056 227 A1 | 11/2000 | |
| JP | 2001-197012 A | 7/2001 | |
| WO | WO 01/89117 A2 | 11/2001 | |
| WO | WO 02/39624 A2 | 5/2002 | |

OTHER PUBLICATIONS

3GPP TS 25.141 v4.0.0, "3GPP; TSG RAN; Base Station Conformance Testing (FDD)," 3GPP Mar. 2001 par.7.4, (Release 1999).

* cited by examiner

RADIO BASE STATION RECEIVER HAVING DIGITAL FILTERING AND REDUCED SAMPLING FREQUENCY

CROSS REFERENCE TO RELATED APPLICATION

This application is a national phase application based on PCT/IB2002/005613, filed Dec. 24, 2002, the content of which is incorporated herein by reference.

BACKGROUND OF THE INVENTION

1. Field of the Invention

The present invention relates to mobile radio communications networks and in particular concerns a station for processing transmission signals relating to a cellular mobile radio communications system and to a method for processing these signals.

2. Description of the Related Art

As is known, at the main hierarchical levels of a conventional cellular mobile radio communications network there are the following: a switching center for processing the calls of mobile radio communications traffic and for managing the interface with the public telephone network, base radio stations connected and controlled by the switching center, and mobile stations or terminals in communication with the base radio stations.

In general, the technological choice forming the basis of cellular networks consists in associating the various base radio stations with a respective area or cell within the territory. Moreover, in principle, each cell has associated with it a group of radio channels which may also be reused in another cell, situated at given distance from the first cell and if necessary also adjacent thereto, depending on the type of mobile radio communications system.

According to conventional architecture of cellular networks, the base radio stations, which are located in sites spread over the territory covered by the mobile radio communications system, have the function of performing suitable processing of signals received from the mobile terminals (uplink) or to be transmitted thereto (downlink). In particular, according to conventional architectures, the base radio station houses those apparatus which have the main functions of receiving/transmitting voice or data signals and which perform coding or decoding thereof in accordance with a particular mobile radio communications system used, for example, the system UMTS (Universal Mobile Telecommunication System).

With particular reference to the UMTS systems, in a mobile radio communications network of a specific operator who provides this system, the power of the signals emitted by the mobile terminals is controlled so that the said signals are received by the base radio station with power levels which are substantially the same.

However, it may happen that an antenna of a base radio station does not receive only the signals of a mobile terminal operating within the system of the respective operator, but also signals emitted by an external mobile terminal, i.e. relating to a different operator. In particular, it may happen that this other mobile terminal emits signals on a carrier frequency adjacent to the channel on which the mobile terminal of the subscriber is transmitting. These adjacent signals may interfere with the signal to be received, adversely affecting the reception performance during an uplink connection. In this respect, there exist standards which define the performance characteristics required of a base station receiver for the rejection of the adjacent channels.

A particular type of mobile radio communications network, which has developed in parallel with optical transmission systems, uses optical fiber links between suitable units of the said network.

In this connection, the patent application US-A-2002/0003645 describes a mobile communication network employing a central control unit and a plurality of base stations called "compact" stations and coupled to a base station controller by means of digital optical links, including optical fibers. According to this document, certain specific functions of the network are assigned to the controller and to the central control unit, while the remaining functions are distributed among the compact base stations. In particular, each compact base station comprises the apparatus associated with radiofrequency and, during the uplink connection, receives by means of an antenna the signals transmitted from a mobile station and, after low-noise amplification, performs first analog filtering of a particular frequency. Subsequently, a down-conversion of the frequency of the filtered signal is performed, said signal then undergoing a second analog filtering operation. The resultant signal is again amplified and then transmitted to an analog-digital converter and then to an optical transmitter.

The document EP-A-714218 describes a microcellular communications system, namely a system where the cells have a radius of between 0.5 and 1 km. The system described includes a base structure associated with the microcell and a central station connected to the base structure by means of an optical fiber.

The structure associated with the microcell is provided with an antenna for receiving radiofrequency signals emitted in uplink mode. The signal received, after suitable amplification, is down-converted to a lower frequency and is sent to a low-pass filter which transmits it to an analog-digital converter connected at its output to an optical transmitter. By means of the optical fiber, the optical signal is received by the central station which converts it into an electrical signal to be sent to a digital-analog converter. The resultant analog signal is filtered so as to perform separation of the signals of each channel which are then demodulated.

The patent application JP-A-2001/197012 describes repeater systems for mobile radio communications networks and shows schematically the apparatus of a base station repeater used for the downlink. This base station repeater is connected, by means of an optical fiber, to a repeater for mobile stations, which receives signals from mobile terminals. According to this document, the base station repeater comprises an antenna (intended to receive signals emitted from another base station) connected to a band-pass filter (which in the figures has a passband of 1 MHz) which extracts a component of the signal having a bandwidth W, such as a component with a bandwidth of 200 KHz. The analog signal thus obtained is converted into a digital signal so as to undergo a downsampling operation. The downsampling operation is preceded by a band-pass filtering operation (which in the figures has a passband again of 1 MHz) in order to extract the replica of the signal having a frequency below half the sampling frequency which is to be used in downsampling. After filtering, downsampling and an electro-optical conversion is performed by means of a suitable converter. According to this document, the solution proposed does not require values of the carrier noise (C/N) and dynamic ratio which are high as in the case of conversion into an analog optical signal. Moreover, the use of a low transmission rate means that it is possible to avoid the use of costly electro-optical converters.

SUMMARY OF THE INVENTION

The Applicant has noticed that, in order to obtain a suitable rejection of the interfering signals associated with the adjacent channels, such as those emitted by an external mobile terminal, i.e. relating to a different operator, high-selectivity analog filters may be used, although the latter are difficult to implement and have high costs.

The Applicant has realized that, in the case of the apparatus for an uplink connection, it is possible to obtain a satisfactory performance with regard to rejection of the adjacent channels and at the same time limit the costs and the complexity of the said apparatus, using an analog filter and a digital filter having different selectivity with respect to the adjacent channels.

Moreover, referring, for example, to the use of optical fibers or other guiding structures in the mobile radio communications network, the Applicant has noted how, during the uplink connection, by reducing the frequency of sampling of the signal after the latter has undergone the abovementioned digital filtering, it is possible to obtain at the same time the necessary rejection of the adjacent channels and an advantageous reduction of the band occupied in the fiber.

According to a first aspect, the present invention relates to a station for processing a first signal which can be generated by a mobile terminal and belongs to a plurality of signals for mobile radio communications networks, said station including:

an input able to receive from an antenna (A) the first signal associated with a first band and at least one adjacent signal of said plurality associated with a second band adjacent to that of the first signal;

a processing stage for generating from the first signal and from the at least one adjacent signal a first digital signal at a first sampling frequency, this first digital signal including a useful spectral content of the first signal and an interfering spectral content associated with said adjacent signal;

a digital filter for processing the first digital signal, attenuating the interfering spectral content, and for providing a filtered digital signal including at least part of said useful spectral content;

an electro-optical converter for generating from said filtered digital signal electromagnetic radiation to be transmitted on a waveguide.

Preferably, the processing station also comprises a sampling frequency reducer connected to said digital filter for generating a second digital signal having a second sampling frequency lower than said first frequency.

Advantageously, the processing stage comprises an analog filter having a passband such as to eliminate second signals of said plurality which are non-adjacent to the first signal and transmit a first electrical signal having said useful spectral content and said interfering spectral content.

According to a preferred embodiment of the invention, said analog filter (BP-IF) is a Chebyshev filter of the $3^{rd}$ to $7^{th}$ order.

According to a particular embodiment of the invention, the processing station includes a demodulator connected to said analog filter for demodulating the first electrical signal and generating at least one demodulated electrical signal associated with a third band and including at least portions of the useful spectral content of the first signal and the interfering spectral content of the adjacent signal.

Advantageously, said processing signal also comprises an analog-digital converter for converting an additional electrical signal correlated to the first electrical signal into said first digital signal.

Preferably, said first sampling frequency is greater than or equal to double said passband of the analog filter.

According to a particular embodiment of the invention, said first sampling frequency is greater than or equal to double said third band of the demodulated electrical signal.

Advantageously, said digital filter is an FIR filter with a number of taps such as to allow attenuation of the interfering spectral content.

In particular, the sampling frequency reducer includes:

an anti-aliasing digital filter for filtering said filtered digital signal and having a cut-off frequency substantially equal to half of said second sampling frequency;

a decimator for sampling a digital signal output from the anti-aliasing digital filter at said second sampling frequency.

According to a second aspect, the present invention relates to a method for processing a first signal which can be generated by a mobile terminal and belongs to a plurality of signals for mobile radio communications networks, said method comprising the steps of:

receiving the first signal and second signals of said plurality including at least one signal adjacent to the first signal and interfering with the latter;

performing analog filtering of a first electrical signal corresponding to said first signal and to said second signals in order to eliminate the signals of said plurality which are non-adjacent to the first signal and transmit a second electrical signal having a useful spectral content associated with the first signal and an interfering spectral content associated with the adjacent signal;

converting from analog to digital the filtered first electrical signal so as to generate a digital signal, said conversion occurring at a first sampling frequency and defining a first transmission rate of said first digital signal;

performing digital filtering of the first digital signal in order to eliminate substantially the interfering spectral content and provide a first filtered digital signal including said useful spectral content;

reducing the sampling frequency of said first filtered digital signal so as to obtain a second filtered digital signal to be sent on a first output bus and having a second transmission rate less than the first transmission rate.

Advantageously, the processing method includes the steps of:

converting an electrical signal correlated to said first filtered digital signal into electromagnetic radiation;

transmitting said electromagnetic radiation on a waveguide.

Preferably, the processing method also comprises a step of multiplexing on a second output bus the second filtered digital signal with additional digital signals associated with additional signals of said plurality which can be generated by additional mobile terminals.

According to a particular embodiment of the invention, the processing method comprises the steps of:

before said electrical to optical conversion step, performing a conversion, from parallel to serial, of the second filtered digital signal;

processing the second serialized digital signal so as to generate a corresponding electrical signal in accordance with a transmission protocol relating to said optical waveguide.

According to a third aspect, the present invention relates to a mobile radio communications network including:

- a main control center of the network for managing a plurality of signals;
- a station for processing said signals, controlled by said main control center, the processing station being provided with a port for receiving electromagnetic radiation;
- a waveguide having a first end connected to said output port;
- at least one antenna station for processing a first signal which can be generated by a mobile terminal and belongs to the plurality of signals, said station being connected to a second end of the waveguide and including:
- an input able to receive from an antenna (A) the first signal associated with a first band and at least one adjacent signal of said plurality associated with a second band adjacent to that of the first signal;
- a processing stage for generating from the first signal and from at least one adjacent signal a first digital signal at a first sampling frequency, this first digital signal including a useful spectral content of the first signal and an interfering spectral content associated with said adjacent signal;
- a digital filter for processing the first digital signal, attenuating the interfering spectral content, and for providing a filtered digital signal including at least part of said useful spectral content;
- a converter for generating from said filtered digital signal electromagnetic radiation to be transmitted to the processing station by means of the waveguide.

Preferably, the mobile radio communications network also comprises a sampling frequency reducer connected to said digital filter for generating a second digital signal having a sampling frequency lower than said first frequency.

Advantageously, said processing station includes processing apparatus for coding/decoding voice or data signals to be sent/received to/from said at least one antenna station.

According to a particular embodiment, the processing station also includes a block for processing signals supplied from said apparatus so that they are compliant with procedures for transportation on said waveguide.

Preferably, additional antenna stations provided with respective antennas are connected to said waveguide.

In particular, the mobile radio communications network is such as to operate using a system of the UMTS (Universal Mobile Telecommunication System) type.

Advantageously, said waveguide is an optical fiber. In particular, said waveguide forms a point-to-point link. Alternatively, said waveguide forms a ring connection between said antenna stations.

Advantageously, an SDH (Synchronous Digital Hierarchy) standard is used for transportation on said waveguide.

As a result of the teachings of the present invention, it is possible to obtain the required rejection of the interfering signals associated with the adjacent channels, avoiding the need to use high-selectivity analog filters, which are difficult to implement and have high costs.

In accordance with the invention, filtering, which plays a greater part in attenuation of the interfering signals, is performed by means of digital filters which can be realized at a cost lower than that of analog filters, but are such as to provide satisfactory results and, in particular, such as to comply with the standards which define the performance of receivers in relation to adjacent channels.

Moreover, the reduction in the sampling frequency performed on the signal output from the digital filter results in limitation of the band occupied by each channel in the waveguide link (for example, optical fiber), allowing an increase in the number of antenna units which can be served by the same link, both of the ring and star type.

It should be noted that the reduction in the transmission rate also has the advantage of allowing the use of STM-N frames (preferably, the frame STM-4) with which not particularly complex and costly components are associated.

In particular, the network according to the invention, using according to a preferred example the transmission of digital signals on optical fiber, has advantages associated with the fact that digital signals are less subject to degradation due to attenuation in the fiber and dispersion within the fiber than analog signals.

BRIEF DESCRIPTION OF THE DRAWINGS

Further characteristic features and advantages of the present invention will emerge more clearly from the following detailed description of preferred embodiments thereof provided by way of example in the accompanying drawings in which.

DETAILED DESCRIPTION OF THE INVENTION

The present invention makes reference, by way of example, to third generation cellular mobile radio communications system such as, for example, UMTS (Universal Mobile Telecommunication System). The person skilled in the art will note how the teachings of the present invention are applicable to other types of digital and analog mobile radio communications systems such as, for example, GSM (Global System for Mobile communications), D-AMPS (Digital Advanced Mobile Phone System) or analog systems such as, for example, AMPS (North American Analog Cellular Systems), NMT (Nordic Mobile Telephone service), TACS (Total Access Communications Service).

The UMTS system is a WB (wideband) system which uses CDMA (Code Division Multiple Access). Moreover, the UMTS system supports radio access to the network both of the TDD (Time Division Duplex) type and of the FDD (Frequency Division Duplex) type. FDD access is particularly suitable for wide-area coverage such as, for example, public micro- or macrocells.

The UMTS system operates within the following frequency bands: 1885-2025 MHz and 2110-2200 MHz (in Europe, 1920-1980 MHz for an FDD uplink connection, i.e.

a transmitting mobile telephone and receiving base station; 2110-2170 MHz for an FDD downlink connection, i.e. a transmitting base station and receiving mobile telephone; 1900-1920 and 2010-2025 MHz for TDD, in the two transmission directions alternating over time; 1980-2010 and 2170-2200 MHz for UMTS Satellite).

The UMTS-FDD system envisages a number Nc of channels (for example 12) (for each connection, uplink and downlink), each having a band of about 5 MHz, and uses modulation of the angular type such as, for example, QPSK (Quadrature Phase Shift Keying) modulation.

In accordance with CDMA technology, the channel bandwidth is shared by N subchannels identified according to the "code" associated with them. As is known, according to CDMA technology of the direct sequence type (multiplication of the signal to be transmitted by a pseudo-random sequence with a higher bit rate), each user is assigned a code which identifies him/her in a precise manner within a frequency band in which various users are present.

Figure 1:
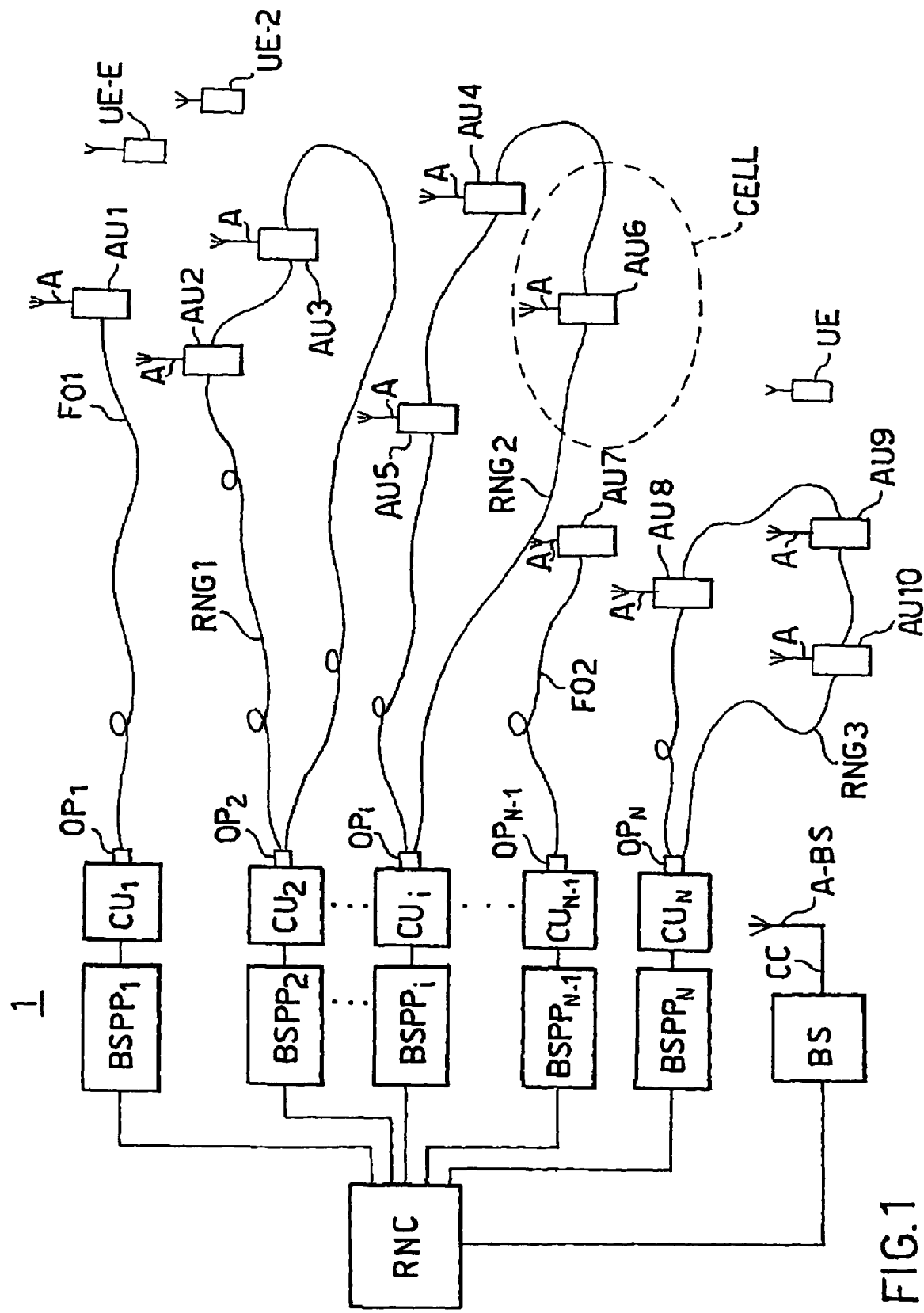
FIG. 1 shows in schematic form a mobile radio communications network according to the invention.

FIG. 1 shows in a schematic manner a particular example of a mobile radio communications network 1, in accordance with the invention. According to the example described, the mobile radio communications network 1 uses a mobile radio communications system of the UMTS type.

The network 1 according to FIG. 1 comprises a main control center RNC and a subnetwork of the ROF (Radio Over Fiber) type, including a plurality of base station processing sections $BSPP1$-$BSPP_N$, each of which can be controlled by the control center RNC and is connected to a respective central unit $CU_1$-$CU_N$.

Moreover, the network 1 may also comprise a subnetwork of the conventional type including at least one base station of the conventional type BS which can be controlled by the main control center RNC and which is connected to a respective antenna A-BS by means of a coaxial cable.

The mobile radio communications network 1 comprises a plurality of antenna units AU1-AU10, provided with corresponding antenna A, each operating in a respective cell of the cellular mobile radio communications network (for the sake of clarity of the drawing, a single cell indicated by "CELL" is shown in FIG. 1).

The antenna units AU1-AU10 are connected to the plurality of central units $CU_1$-$CU_N$ by means of waveguide links for the propagation of electromagnetic radiation.

These waveguide links may comprise, for example, optical waveguides such as optical fibers, typically housed in optical-fiber cables. Preferably, single-mode optical fibers are used. According to an alternative, not shown in the Figure, electromagnetic waveguides of the non-optical type, for example coaxial cables, may be used at least partly.

In the case of use of optical fibers, the central units $CU_1$-$CU_N$ are provided with respective optical input/output ports OP1-OPN. In particular, the mobile radio communications network 1 in the example shown comprises a first optical fiber FO1 having a first end connected to the optical port OP1 and a second end connected to the antenna unit AU1. Similarly, a second optical fiber FO2 is connected to the port of the antenna unit AU7, forming a point-to-point link. Moreover, the mobile radio communications network 1 is provided with optical fibers which form ring networks RNG1, RNG2 and RNG3 for the connection, respectively, of the antenna units AU2-AU3, AU4-AU6, AU8-AU10 to the respective optical ports OP2, OPi and OPN.

The transmission on one of the optical fibers F01-F02 or on one of the rings RNG1-RNG3 may be performed using the technique of wavelength division multiplexing (WDM), whereby each transmission channel sent toward the corresponding antenna unit is formed by means of a signal of predetermined wavelength. Alternatively, for example, the transmission on optical fibers or on rings may use the technique of optical time division multiplexing (TDM).

The optical fibers may transport the data in both transmission directions or, preferably, a separate fiber is used for each transmission direction (uplink and downlink).

The mobile radio communications network 1 includes mobile telephones or terminals UE, UE2 for example, of the conventional type, and such as to send and receive transmission signals in free space to/from the antennas A of the antenna units AU1-AU10, using the procedures of the UMTS system.

With reference to the ROF subnetwork of the mobile radio communications network 1, it is pointed out that the base station processing sections $BSPP1$, $BSPP_N$ comprise apparatus which perform the functions of processing baseband signals, whereas the antenna units AU1-AU10 comprise apparatus which process or handle radiofrequency signals.

It is pointed out that those processing functions which in conventional mobile radio communications networks (such as the subnetwork including the base station BS connected to the antenna A-BS) are performed in the base station associated with an antenna of the network, in the case of an ROF-type subnetwork, however, are separated between the antenna units AU1-AU10 and the processing sections $BSPP1$-$BSPP_N$ located in geographical locations different from the antenna units.

This separation of the functions has the advantage of allowing easier installation of the (less complex) apparatus to be arranged in the vicinity of the antennas A, while the remaining processing apparatus may be situated in a limited number of main control centers RNC.

Figure 2:
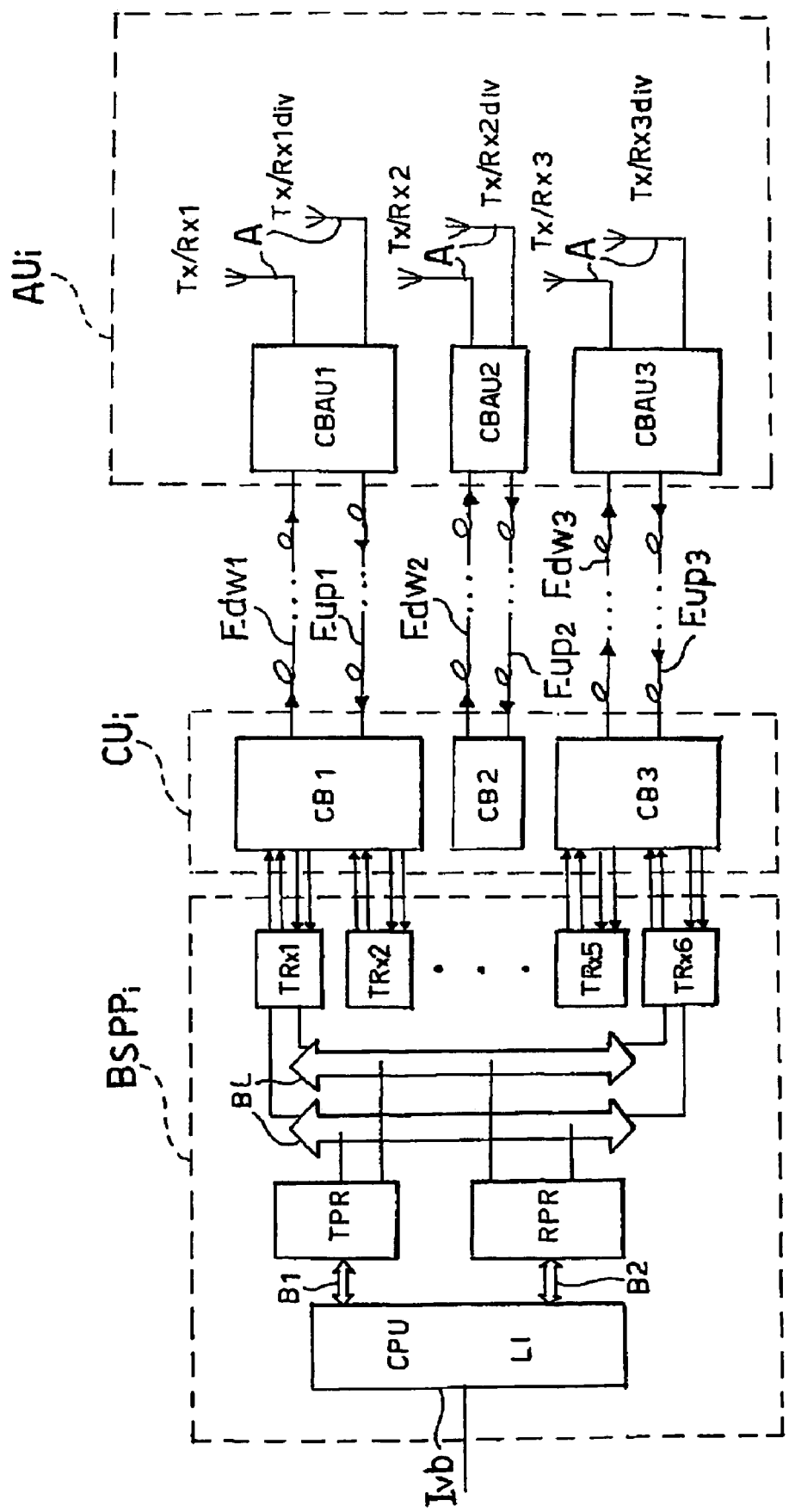
FIG. 2 shows, in the form of functional blocks, a possible structure of a processing section included in the network according to FIG. 1.

FIG. 2 shows, in the form of functional blocks, a possible structure of a base station processing section BSPPi connected to a central unit CUi and a respective antenna unit AUi.

In particular, as will become clear below, the example shown in FIG. 2 refers to the case of a structure of the type 3×2, i.e. a structure such as to provide two carriers for every three angular sectors served by the antennas associated with the antenna unit AUi. According to a known method in radio transmission, each carrier of each sector has associated with it an additional carrier (with the same frequency) relating to the—for example spatial or polarization—diversity so as to compensate for possible causes of disturbance or attenuation in the air which may adversely affect the transmission/reception of one of the two carriers of the sector.

In greater detail, the base station processing section BSPPi includes an interface Iub for communication with the main control center RNC, including a processing unit CPU and associated interface lines LI. This interface Iub has, connected to it, by means of suitable buses B1 and B2, respectively, transmission and reception processing apparatus TPR and RPR of the conventional type and commonly called Transmitter Processing Resources (TPR) and Receiver Processing Resources (RPR). These processing apparatus TPR and RPR perform the main functions of receiving/transmitting the voice or data signals in accordance with the procedures defined by the particular mobile radio communications system used, for example UMTS. In particular, in downlink mode, the apparatus TPR performs coding of the voice and data signals as required by the UMTS system (spreading) and, in uplink mode, the apparatus RPR performs corresponding decoding (despreading).

It is precisely, these apparatus TPR and RPR which traditionally were installed at each base station of a mobile radio communications network, while in the solution according to the invention, these apparatus may be located far from the antenna units and may be used to serve one or more than one of these units.

Moreover, the base station processing section BSPPi includes a group of six receivers/transmitters (or in short, transceivers) TRx1-TRx6 connected, by means of further buses and lines Bl, both to the apparatus TPR and RPR and to the central unit CUi.

During transmission (downlink), the transceivers TRx1-TRx6 may perform modulation/demodulation (for example, of the QPSK or BPSK type) of the signals supplied by the apparatus TPR or by the central unit CUi. Preferably, the transceivers TRx1-TRx6 are such as to transmit signals in the baseband (not modulated angularly) or signals at an intermediate frequency IF. Moreover, these transceivers TRx1-TRx6 may or may not perform an analog-digital conversion of the signal to be emitted.

Similarly, during reception (uplink), the transceivers TRx1-TRx6 may receive an analog or digital baseband signal or an intermediate frequency signal from the central unit CUi.

The central unit Cui includes three processing/conversion sections CB1-CB3 each connected to a pair of transceivers TRx1-TRx6.

The processing/conversion sections CB1-CB3 are connected by means of the optical switch OPT-SWTC (not shown in FIG. 2) to respective pairs of optical fibers F-Dw1 and F-Up1, F-Dw2 and F-Up2, F-Dw3 and F-Up3, each relating to one of the three sectors. These optical fibers link the central unit CUi to the antenna unit AUi.

The antenna unit AUi includes three antenna substations CBAU1-CBAU3, each linked by means of one of the above-mentioned pairs of optical fibers to a respective processing/conversion section CB1-CB3.

Each antenna substation CBAU1-CBAU3 is associated with one of the three sectors (served respectively by two carriers) and comprises, preferably, a pair of antennas (Tx/Rx1 and Tx/Rx1div (Tx/Rx2 and Tx/Rx2div; Tx/Rx3 and Tx/Rx3div). As is known in the mobile telephone sector, for each sector two antennas may be installed, such as the two antennas Tx/Rx1 and Tx/Rx1div separated according to space or polarization diversity. The antennas Tx/Rx1 and Tx/Rx1div emit/receive radiofrequency electromagnetic waves over an angular sector with an aperture, for example, of 120°. Instead of duplex reception and transmission antennas, it is possible to use separate antennas for transmission (Tx1 and/or Tx1div) and for reception (Rx1, Rx1div). The example of a base station processing section BSPPi described here is such as to provide an additional diversity carrier for each sector. It is possible to use an additional carrier for the diversity only in the uplink direction or else dispense with the diversity in both the directions of propagation, where it is possible to avoid assigning additional carriers for this purpose.

Figure 3:
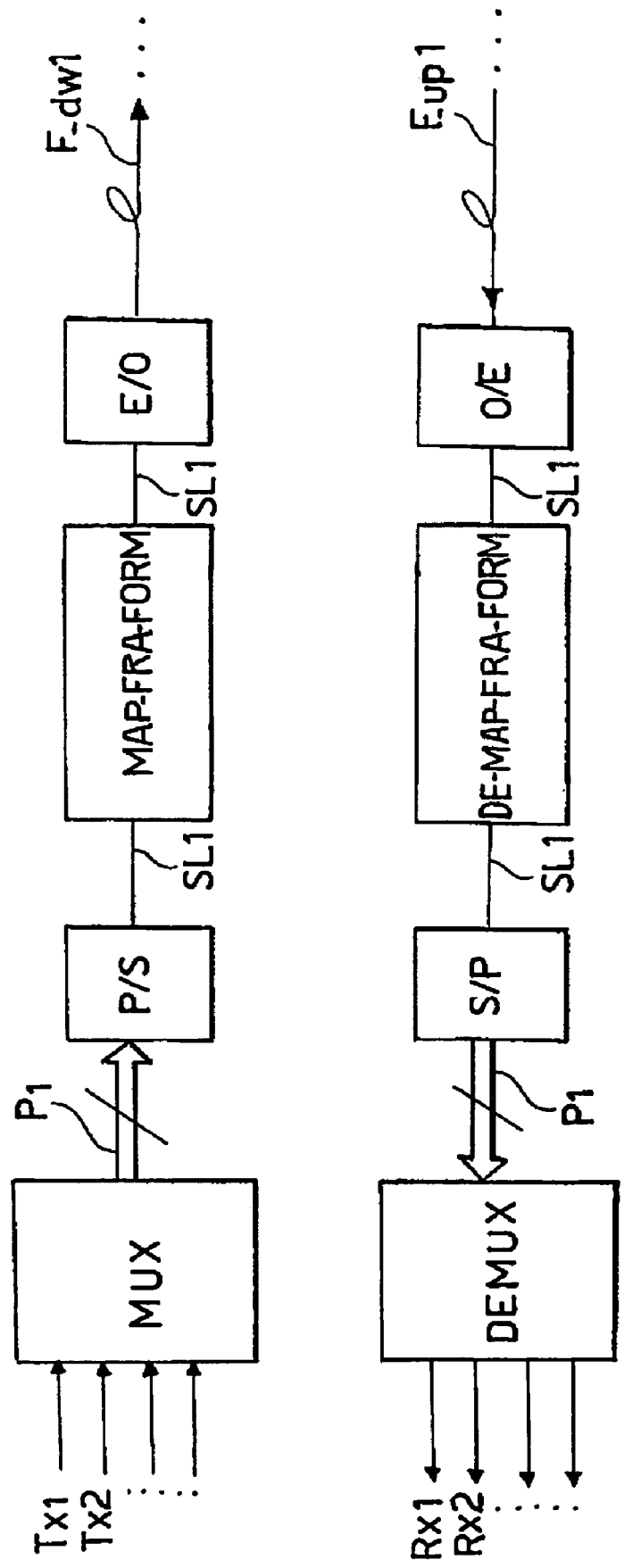
FIG. 3 shows a possible structure of a processing/conversion section of the network according to FIG. 1.

FIG. 3 shows, in greater detail, a possible structure of the processing/conversion section CB1.

As regards the downlink, this processing/conversion section CB1 includes a multiplexer MUX for receiving modulated—preferably digital—signals emitted by the transmitting sections Tx1 and Tx2 of the transceivers TRx1 and TRx2 and multiplexing them on a parallel bus P1 connected to a parallel-to-serial converter P/S. An output SL1 of the converter P/S is connected to a processing block MAP-FRA-FORM for performing processing of the electrical signals to be transmitted so as to make them suitable for a specific handling procedure relating to transfer on the optical link such as the fiber F-dw1.

For example, the processing block MAP-FRA-FORM may be such as to process the signals output from the converter P/S using an SDH (Synchronous Digital Hierarchy) transportation protocol, introducing the corresponding frame format and the corresponding line coding. As an alternative to the SDH transportation protocol, a GbE (Gigabit Ethernet) or other suitable protocols may be used.

This processing block MAP-FRA-FORM may be of the conventional type and include suitable electronic processing boards which are commercially available. For example, it is possible to map the UMTS samples on standard SDH frames of the STM-N type (STM-16 at 2.5 Gbit/s or other rates) so that they are compatible with transmission systems designed for the SDH standard.

It is envisaged to arrange an electrical-to-optical converter E/O after the processing block MAP-FRA-FORM. The electrical-to-optical converter E/O may be designed to emit a signal of suitable wavelength such as to form one of the channels of the WDM grid used in the ROF system. Preferably this grid comprises spatial channels of about 20 nm in a band having wavelengths ranging between 1420 and 1620 nm (CWDM "Coarse WDM"). As an alternative, the E/O converter may emit a signal having a wavelength in the band around 1300 nm or, less preferably, in the band around 850 nm.

As regards the uplink, the processing/conversion section CB1 comprises an optical-to-electrical converter O/E (for example, a detector including a semiconductor diode) which is connected at its input to a fiber F-up1 (intended for uplink) and at its output to a processing block DE-MAP-FRA-FORM. This processing block, which is intended to eliminate the line coding and the associated format of the signals received, is connected to a serial-to-parallel converter S/P and then to a demultiplexer DEMUX for sending the signals, preferably in digital form, on lines corresponding to receiving sections Rx1 and Rx2 of the transceivers TRx1, TRx2.

With reference to the downlink, the processing/conversion section CB1 of the central unit CUi in FIG. 2 receives the signal of a given channel from a respective base station processing station BSPPi and digitizes it (if this signal is analog), multiplexes it with other signals by means of the multiplexer MUX and performs serialization of the digital flow (P/S converter). Moreover, the block MAP-FRA-FORM introduces the desired line coding and the desired frame format and, by means of the converter O/E, electromagnetic radiation suitable for being sent on the fiber F-dw1 is generated.

The subsection CBAU1 of the antenna unit AUi receives the optical flow from the fiber F-dw1 and processes the signals as will be described in greater detail below, in order to transmit associated radiofrequency signals from the antennas A.

With reference to the uplink, the substation CBAU1 of the antenna unit AUi receives signals from the antennas A and, after processing which will be described in greater detail below, converts them into optical signals. The processing/conversion section CB1 of the central unit CUi receives by means of the fiber F-up1 assigned to the uplink optical signals which are converted into electrical signals by the optical-to-electrical converter O/E. Subsequently, the line coding and the frame format are eliminated from these electrical signals by means of the processing block DE-MAP-FRA-FORM. Moreover, after serial-to-parallel conversion (S/P converter) and, if necessary, digital to analog conversion, the signals are demultiplexed by the demultiplexer DMUX and sent to the associated receiving section Rx1, Rx2 of the base station processing section.

Figure 4:
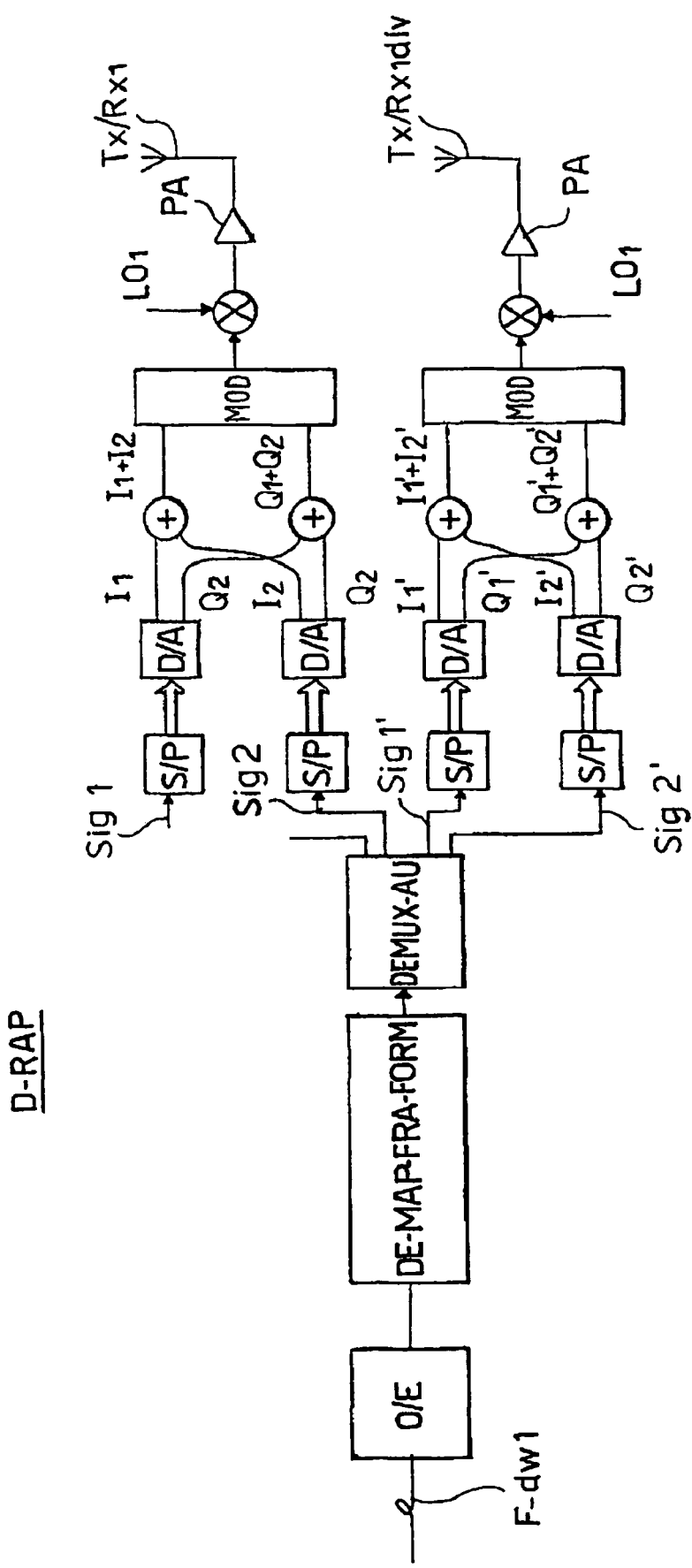
FIG. 4 shows a possible structure of a section of an antenna unit of the network according to FIG. 1, assigned for the downlink connection.

FIG. 4 shows a possible structure of a remote section or part D-RRP of a subsection of the antenna unit AUi, such as the subsection CBAU1. This remote part D-RRP is assigned to the downlink.

The remote downlink part D-RRP comprises a respective optical-to-electrical converter O/E (for example similar to that described above) which is connected to an optical fiber, such as the fiber F-dw1 coming from a central unit (for example, the unit CUi in FIG. 3).

This O/E converter is followed by a processing block DE-MAP-FRA-FORM (similar to that shown in FIG. 2) having an output connected to a demultiplexer DEMUX-AU. The demultiplexer DEMUX-AU is provided with four outputs for two signals Sig1 and Sig2 centered on two respective carriers and for two additional—for example diversity-related—signals Sig1' and Sig2' centered on two additional carriers.

The four output lines of the demultiplexer DEMUX-AU are connected to respective processing branches, each including a serial-to-parallel converter S/P having an output bus connected to a digital-analog converter D/A. Suitable output lines of the digital-analog converters D/A supply the in-phase and quadrature components of the respective input signals. According to FIG. 4, the in-phase component I1 (I2) and the quadrature component Q1 (Q2) are associated with the signal Sig1 (Sig2). Similarly, with regard to the diversity carriers, the in-phase component I1' (I2') and the quadrature component Q1' (Q2') are associated with the signal Sig1' (Sig2').

The station in FIG. 4 comprises, moreover, conventional devices, represented schematically as adder nodes, for combining, bundling them together in the baseband, the in-phase components I1+I2 (I1'+I2') and the quadrature components Q1+Q2 (Q1'+Q2'). The adder devices are connected to two modulators MOD (for example, QPSK), each having an output connected to a frequency converter (shown as a multiplier connected to a local oscillator, LO1) for converting into radiofrequency RF the intermediate frequency IF of the signals output from the modulators MOD.

The outputs of the converters IF/RF are connected to power amplifiers PA and then to the two antennas Tx/Rx1 and Tx/Rx1div.

During downlink operation, the station D-RRP receives the optical flow from the fiber F-dw1 and converts it by means of the converter O/E into an electrical signal. The block DE-MAP-FRA-FORM eliminates the line coding and the frame format relating to the SDH protocol, which were previously introduced, and sends the signal thus processed to the demultiplexer DEMUX. This demultiplexer separates the four carriers, which are converted into four corresponding parallel digital flows by means of the converters S/P. These digital flows are converted into analog signals by the converters D/A and suitably combined by means of the adder devices. After a modulation performed by the modulators QPSK, MOD, conversion from intermediate frequency to radiofrequency is performed. The radiofrequency signals are then amplified and radiated by means of the respective antennas Tx/Rx1 and Tx/Rx1div.

Figure 5:
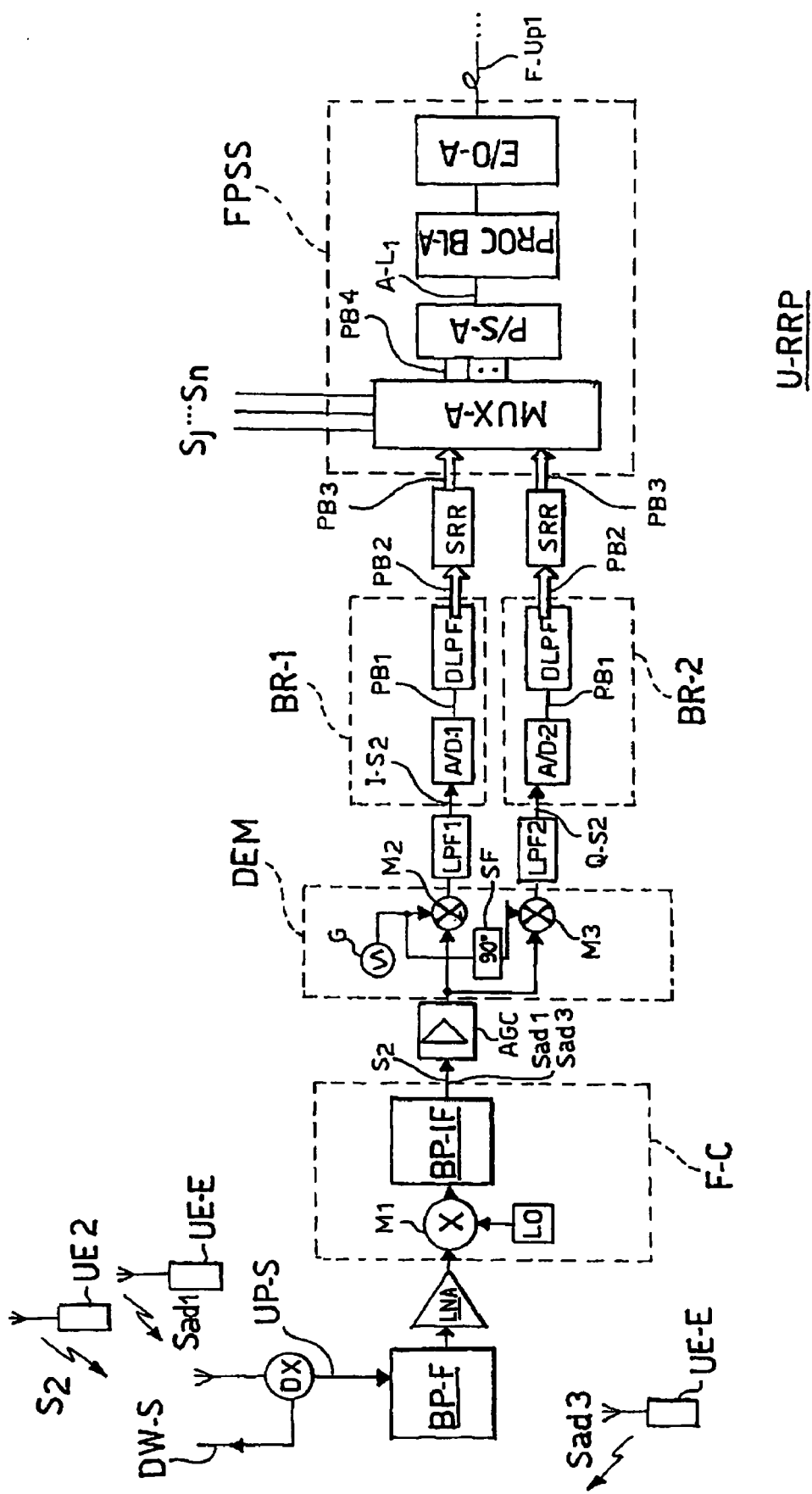
FIG. 5 shows in schematic form a first embodiment of a section of an antenna unit of the network according to FIG. 1, assigned for the uplink connection.

FIG. 5 shows schematically a first embodiment of a remote radio station or part U-RRP (Remote Radio Part) of a mobile radio communications network in accordance with the invention, which is assigned to the uplink. The remote radio station U-RRP may be included in one of the antenna units AU1-AU10 (for example, the unit AU1).

This station U-RRP is such as to perform suitable processing of a radiofrequency transmission signal $S_2$ having a specific carrier $F_i$ belonging to the carrier frequencies stipulated by the particular mobile radio communications system used (such as the system UMTS-FDD). Said processing includes, among other things, reception, analog-digital conversion, digital filtering and electro-optical conversion.

With reference to FIG. 1, the transmission signal $S_2$ may be, for example, emitted by a mobile telephone UE2 included in a cell associated with the antenna unit AU1. For example, the transmission signal $S_2$ is in a shifted band, namely is modulated in accordance with that laid down by the particular mobile radio communications system (for example, in the case of the UMTS-FDD system, this signal is modulated using the QPSK technique).

A channel Ch2 of the mobile radio communications network 1 having the carrier at a frequency Fi is associated with the transmission signal $S_2$. A possible value for this frequency of the carrier Fi is, for example, 1940 MHz.

The transmission signal $S_2$ has, for example, a (shifted) band $B_S$ having an amplitude equal to about 4.6 MHz in accordance with that envisaged in an UMTS system. The band $B_S$ may be defined as the frequency interval (symmetrical about the carrier frequency) to which a considerable part of the spectral content of the signal corresponds. In particular, the band $B_S$ may be defined as the frequency interval to which a certain percentage of the power of the signal $S_2$ (for example, 99%) corresponds. According to another possible definition, the band $B_S$ is defined by the frequency interval outside of which there are no spectral components having an amplitude greater than the threshold amplitude At equal to the amplitude of the useful signal A reduced by a predefined quantity, for example reduced by 20 dB, At=A−20 dB.

The signal $S_2$ has, associated with it, the channel Ch2 centered on the carrier frequency Fi and having a channel band $B_{ch}$, for example of about 5 MHz. It is pointed out that, as is obvious to the person skilled in the art, in the case of the UMTS system, a distinction is made between chip frequency, equal to about 3.84 MHz, and amplitude of the band daI occupied by the signal, defined approximately by the value 3.84 MHz multiplied by a factor of 1.22, due to the action of a filter of the so-called "cosine filter" type. Advantageously, the station U-RRP is such as to process the transmission signal $S_2$ also in the presence of signals interfering with the signal $S_2$, such as the adjacent signals.

With reference to the radiofrequency signals, a signal adjacent to the transmission signal $S_2$ is understood as meaning that signal which is situated in a channel (Ch1 or Ch3) adjacent to the channel of the signal $S_2$, i.e. in particular having a carrier frequency $F_{I-1}$ or $F_{I+1}$ which, according to the allocation of the frequencies established by the specific mobile radio communications system, is situated immediately before or after the carrier frequency Fi of the channel of the signal $S_2$.

For example, in the case where the carrier Fi is equal to 1940 MHz, the carrier frequencies of the adjacent channels are centered on $F_{I-1}$=1935 MHz and $F_{I+1}$=1945 MHz.

It is pointed out that in UMTS systems the power of the signals which operate in the network of a specific operator are controlled so that the signals within the network are received by the base station with power levels which are substantially the same.

It may occur that an external mobile telephone UE-E, i.e. associated with a mobile radio communications network managed by an operator different from that of the mobile radio communications network 1 according to FIG. 1 is located in the vicinity of the antenna unit AU1 and emits an adjacent signal $S_{ad1}$ ($S_{ad3}$) having a carrier frequency $F_{I-1}$ (or $F_{I+1}$) adjacent to the frequency Fi. Moreover, this external mobile telephone UE-E will be placed in communication with an antenna of a base station (not shown) of the mobile radio communications network with which it is associated, located within an associated cell, but at what may be a considerable distance from the external mobile telephone itself.

In this case, the mobile radio communications system of this external telephone UE-E may envisage driving the external telephone itself so that it operates at high radiofrequency power values.

Moreover, this external mobile telephone UE-E may be located at a particularly small distance from the antenna unit AU1 of the mobile radio communications network 1.

In this situation, considering the emission power of the external mobile phone UE-E, the antenna unit AU1 may receive the adjacent signal $S_{ad1}$ (or $S_{ad3}$) having a considerable power such as to interfere with the transmission signal $S_2$ emitted by the mobile telephone UE1.

It may be assumed that the adjacent signal $S_{ad1}$ (or $S_{ad3}$) occupies a band which has a width approximately equal to that of the signal $S_2$ and which has components which are situated outside of the band by a considerable amount and which interfere with the useful signal $S_2$.

Returning to FIG. 5, the station U-RRP is provided with an antenna A connected by means of a conventional duplexer DX (for separation/coupling of the uplink signals UP-S and downlink signals DW-S) to stages for processing the uplink signals. The antenna A may be one of the two antennas Tx/Rx1 or Tx/Rx1div which take account of the diversity. In greater detail, the antenna A is connected to an input of a band-pass filter BP-F having an output connected to a low-noise amplifier LNA. This antenna A allows the reception of a plurality of radiofrequency (RF) signals in free space, which can be generated by mobile phones, and allows them to be converted into electrical signals.

The band-pass filter BP-F has a passband for example of about 60 MHz so as to allow the uplink electrical signals to pass through and eliminate high-frequency noise and the downlink signals. The amplifier LNA is such as to perform the low-noise power amplification of the signals output from the band-pass filter BP-F so as to reduce the overall noise level of the receiver.

Moreover, the remote radio station U-RRP may comprise a stage F-C for conversion of the RF electrical signals into intermediate frequency (IF) signals.

According to the particular example described, this frequency conversion section F-C comprises a first multiplier M1, which is connected to an output of the low-noise amplifier LNA, a local oscillator LO which is such as to supply a suitable frequency signal to the first multiplier M1 and an intermediate frequency band-pass analog filter BP-IF, which is connected at its output to the said multiplier M1 and is such as to extract intermediate frequency (IF) electrical signals.

For example, at the output of the intermediate frequency band-pass filter BP-IF signals having frequencies ranging, for example, between 70 and 110 MHz are present.

In particular, at the output from the intermediate frequency conversion stage F-C, the signal $S_2$ will be centered on a frequency, for example having a value $F_{IF}$=70 MHz.

Preferably, the frequency conversion section F-C is such as to have also a channel filtering function, i.e. is such as to perform a selection of said transmission channel $Ch_2$, from among the plurality of channels received, rejecting uplink signals far from the frequency $F_{IF}$ and in particular not adjacent to the latter.

It should be noted that, advantageously, this intermediate frequency band-pass analog filter is formed so as not to have particularly marked characteristics in terms of selectivity.

In particular this analog filter BP-IF may have a passband $B_{IF}$ centered on the intermediate frequency carrier $F_{IF}$ of the transmission signal $S_2$, having a width greater than that of the band $b_{Ch2}$ of the signal $S_2$. More particularly, the passband $B_{IF}$ is such as to include also part of the spectral content associated with one or the two signals $S_{ad1}$, $S_{ad3}$ adjacent to the transmission signal $S_2$ and due to the emission of signals by external mobile telephones, such as the external mobile telephone UE-E mentioned above.

Such a filter has a transition band, i.e. the band defined by the difference between the limit frequency of the passband and the limit frequency of the rejection band or stop band (for example, corresponding to the attenuation of 25 dB) having an amplitude such as to allow transmission at least partly of the spectral content associated with the signals $S_{ad1}$, $S_{ad3}$. In particular, the transition band is such as to transmit a considerable content of these adjacent signals.

The intermediate frequency band-pass analog filter BP-IF may be realized by means of a conventional analog filter. Advantageously, the intermediate frequency band-pass filter BP-IF may be realized as a Chebyshev filter of the $3^{rd}$ to $7^{th}$ order (i.e. odd) and therefore not complex and costly to realize. In particular, the intermediate frequency band-pass filter BP-IF may be a Chebyshev filter of the third order, namely with a 3-pole transfer function, which has a passband with 1 dB attenuation compared to the maximum, equal to 5 MHz. As is obvious to the person skilled in the art, such a filter transmits at least partly the spectral content associated with the signals $S_{ad1}$, $S_{ad3}$ and in particular is such as to transmit a considerable content thereof.

Advantageously, the remote radio station U-RRP includes a controlled gain amplifier AGC (for example of the conventional type) for power amplification of the filtered signal output from the intermediate frequency band-pass filter BP-IF.

Moreover, the remote radio station U-RRP comprises an optional demodulator stage DEM connected to an output of the controlled gain amplifier AGC. Let us consider the case where the mobile telephone transmission system is of the UMTS-FDD type with QPSK phase shift modulation (Quadrature Phase Shift Keying). In this case the demodulator DEM is such as to separate in-phase components I from quadrature components Q of the signal output from the controlled gain amplifier AGC.

In the schematic illustration shown in FIG. 5, the demodulator DEM comprises a generator G of a suitable sinusoidal tone connected to a second multiplier M2 and, by means of a 90° phase shifter SF, to a third multiplier M3. The second and the third multipliers M2 and M3 are connected to the output of the controlled gain amplifier AGC so as to receive the intermediate frequency signals output from the latter and multiply them, respectively, with the sinusoidal tone and its 90° phase-shifted replica produced by the generator G.

The second multiplier M2 and the third multiplier M3 are such as to provide at their output analog electrical signals having components resulting from the multiplications performed.

The outputs of the multipliers M2 and M3 of the demodulator DEM are connected, respectively, to a first filter LPF1 and a second filter LPF2, both of the analog low-pass type.

The first low-pass filter LPF1 and second low-pass filter LPF2 allow the removal, from the electrical signals output from the multipliers M2 and M3, respectively, an in-phase baseband (BB) component I-$S_2$ and a quadrature baseband component Q-$S_2$ of the transmission signal $S_2$, which are both of the analog type.

Advantageously, the first and the second low-pass filters LPF1 and LPF2 may have not particularly marked intensity characteristics and therefore have a respective passband which also transmits at least part of the spectral content associated with the adjacent channels $S_{ad1}$, $S_{ad3}$.

The low-pass filters LPF1 and LPF2 may, for example, be realized as conventional analog filters in a similar manner to the band-pass filter BP-IF. In particular, these analog filters may be realized as respective Chebyshev filters of an order which is not high, for example, of the $5^{th}$ order with a 1 dB, 2.5 MHz, unilateral band.

At the output from the first low-pass filter LPF1 and the second low-pass filter LPF2, the remote radio station U-RRP is provided with a first processing branch, BR-1 for processing the in-phase baseband component I-S2 and a second processing branch BR-2, similar to the first branch, for processing the quadrature baseband component Q-S2.

In particular, this first branch BR-1 (second branch BR-2) comprises a first (second) analog-digital converter A/D-1 (A/D-2) for performing an analog-digital conversion of the in-phase component I-S2 (quadrature component Q-S2) connected to the output of the first low-pass filter LPF1 (second low-pass filter LPF2).

The analog-digital converters A/D-1 and A/D-2 may be of the conventional type and are such as to perform sampling at a first frequency $R_S$, quantization and, for example, coding of the respective incoming analog signals. Advantageously, this first sampling frequency $R_S$ is chosen so as to satisfy the Nyquist theorem on sampling and is therefore equal to or, preferably, greater than double the value $B_{I-Q}$.

In the particular example to which reference is made, this first sampling frequency $R_3$ is approximately about 7.5 MHz·2=15 MHz or, in an equivalent manner, 15 megasamples per second. As is known, if the conditions of the sampling theorem are satisfied, distortion of the information content caused by aliasing does not occur.

The analog digital converters A/D-1 and A/D-2 are provided with a respective first output bus PB1 including a suitable number $N_q$ of lines, each assigned to a binary figure representing a digital signal.

Considering a signal composed both of the in-phase component I and the quadrature component Q, a transmission rate or bit rate $R_b$, equal to twice the product of $N_q$ times $R_S$: $R_b$=2 $N_q$ $R_S$, corresponds to the first sampling frequency $R_S$. For example considering a value of $N_q$ equal to 14, the bit rate is 2·14·15=420 Mbit (magabits) per second.

Moreover, each of the two processing branches BR-1 and BR-2 comprises a respective low-pass digital filter DLPF connected at its output to the corresponding analog-digital converter, A/D-1 or A/D-2, followed by a respective sampling frequency reducer SRR (Sampling Rate Reduction).

Each digital filter DLPF is such as to process the outgoing digital signal from the respective analog-digital converter (A/D-1 and A/D-2) so as to attenuate the spectral content of the adjacent signal with respect to the spectral content of the transmission signal $S_2$. These digital filters allow a reduction—or preferably the elimination—of the interference of the adjacent signal affecting the useful components of the transmission signal $S_2$ present at the output of the respective analog-digital converter.

Each of these digital filters may be realized by means of a respective FIR (Finite Impulse Response) filter. For example, this FIR filter has a number of taps equal to 128 or 256 and may have a 1 dB, 2.5 MHz or 2.3 MHz, unilateral band.

The abovementioned digital filters DLPF are connected to a respective sampling frequency reducer SRR by means of a second bus PB2. Each sampling frequency reducer is such as to process the electrical signal received from the respective digital filter DLPF so as to generate an additional digital signal at a second sampling frequency $R_S'$, less than the first sampling frequency $R_S$.

The value of this second sampling frequency $R_S'$ is chosen so as to be sufficiently lower than the first sampling frequency $R_S$ so as to obtain a bit rate $R_b'$ associated with the digital signal to be transmitted in an optical fiber and less than the first bit rate $R_b$ and doing so in such a way as not to lose useful information.

The reduction of the bit rate from the value $R_b$ to the value $R_b'$ allows limitation of the band occupied within the optical fiber and therefore an increase in the number of antenna units which can be served by the same optical fiber.

Advantageously, the second sampling frequency (on each of the two paths I and Q) is chosen so as to be greater or, ideally, equal to twice the minimum band occupied $B'_{I-Q}$ by the in-phase component I or quadrature component Q (ideally $B'_{I-Q}$=1.22·3.84 MHz/2 in the case of UMTS-FDD) of the signal resulting from digital filtering.

In this example, the second bit rate $R_b'$ is between about 140 and 380 Mbit/s, depending on the quality of the digital filtering (a reasonable value is 200 Mbit/s).

The two frequency reducers SRR of each of the two processing branches BR-1 and BR-2 may be of the conventional type and may each comprise therefore, as known to the person skilled in the art, an optional interpolation stage, a digital low-pass filter and a decimator stage. Advantageously, this low-pass digital filter has a cut-off frequency $f_t$ equal to half the second sampling frequency $R_S'$ and has the aim of preventing the subsampling performed by the decimator stage from having distortions resulting from aliasing.

Each frequency reducer SRR is connected by means of a respective third output bus PB3 to an additional multiplexer MUX-A which allows multiplexing, on a fourth bus PB4, of the digital signals corresponding to the in-phase component I and quadrature component Q resulting from the previous stages. Optionally, this additional multiplexer MUX-A allows the multiplexing also of other digital signals $S_j$-$S_n$ relating to other channels of the mobile radio communications network. These signals $S_j$-$S_n$ are output from respective stations of the antenna unit AU1 considered which preferably are similar to the station U-RRP described. This multiplexer may also multiplex the control signals.

The multiplexer MUX-A forms part of a final processing substation FPSS which also comprises an additional parallel-to-serial converter P/S-A connected to the fourth output bus PB4 so as to send in a serial manner the flow of digital data on a single output line A-L1.

An additional processing block PROC-BL-A, also part of FPSS, is connected to the output line A-L1, so as to introduce the frame format and the appropriate line code, for example in accordance with the SDH protocol. It is pointed out that the reduction in the bit rate described above allows the use, for transmission on the optical fiber F-up1 leaving the remote radio station U-RRP, of an SDH frame of the STM-N (Synchronous Transport Module) type with which not particularly complex and costly components are associated. Advantageously, with reference to the SDH, the frames STM-4 and STM-16 having a payload transportation capacity, respectively, of about 599.04 Mbit/s and 2396.16 Mbit/s. In particular on an STM-4 frame two carriers of 299.52 Mbit/s corresponding to an uplink flow and a diversity flow may be transported. Similarly, on the 2396.16 frame three uplink carriers and another three diversity carriers, each with a flow of 399.36 Mbit/s may be carried.

The processing block PROC-BL-A is connected to an additional electro-optical conversion stage E/O-A, also forming part of the final processing substation FPSS, for converting the electrical signal containing the flow of serialized digital data into optical frequency radiation to be sent on the fiber F-up1.

This electro-optical conversion stage comprises, for example, a conventional semiconductor laser for directly converting the electrical signal into an optical signal. Alternatively, the electro-optical conversion stage is realized by means of a laser which emits optical radiation of suitable wavelength, followed by an electro-optical modulator which modulates this optical radiation in accordance with the progression of the electrical signal output from the processing block PROC-BL-A.

With regard to operation of the remote station U-RRP according to FIG. 5, reference should also be made to FIGS. 6a-6d in which spectral patterns of examples of signals which can be processed by the said station U-RRP are shown.

The transmission signal $S_2$ emitted by the mobile terminal UE1, together with other signals $S_{j-Sn}$ emitted by other mobile telephones, is received by the antenna A. In addition to the transmission signals, the antenna A receives at least one adjacent signal or, for example, two adjacent signals $S_{ad1}$ and $S_{ad3}$ (emitted by external terminals UE-E) and located on the channel bands symmetrically adjacent to the channel band of the transmission signal $S_2$. The antenna A converts the signals received into an electrical signal and sends them to the radiofrequency band-pass filter BP-F which eliminates the downlink signals and, by means of an amplification performed by the amplifier LNA, transmits all the uplink signals and the adjacent signals ($S_{ad1}$ and $S_{ad3}$) to the frequency conversion stage F-C. This frequency conversion stage F-C converts the signals received at its input to an intermediate frequency IF and performs analog filtering by means of the band-pass filter BP-IF.

This band-pass filter BP-IF eliminates the transmission signals received at the antenna A and not adjacent to the signal $S_2$ and transmits the signal $S_2$ shifted to an intermediate frequency and including the corresponding useful spectral content. Moreover, the band-pass filter BP-F is such as to transmit also at least portions of the adjacent signals $S_{ad1}$ and $S_{ad3}$ and, in particular, is such as to transmit a considerable spectral content of said adjacent signals. In other words, the analog band-pass filter BP-IF does not have the function of performing a significant attenuation of the adjacent signals.

After amplification performed by means of the controlled gain amplifier AGC, the electrical signal output from the band-pass filter BP-IF is suitably demodulated by means of the demodulator DEM for signals I-Q.

The demodulator DEM, by means of steps involving multiplication or mixing of the electrical signal received at the said demodulator with 90° phase-shifted sinusoidal tones and subsequent separate filtering steps using low-pass analog filters LPF1 and LPF2, returns at least the in-phase component I-S2 and the quadrature component Q-S2 of the transmission signal $S_2$.

Figure 6A:
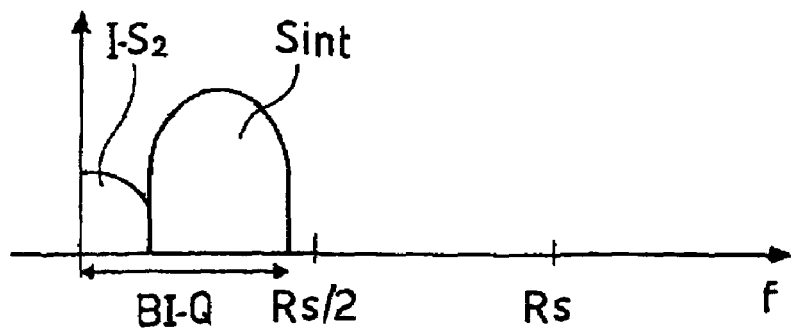
FIGS. 6a-6d show examples of spectral patterns of signals which can be processed by the station according to FIG. 5.

In greater detail, as shown in FIG. 6a relating to only one of the components of the transmission signal (for example, the in-phase component), at the output of the low-pass analog filter LPF1 there is a demodulated analog signal (or baseband signal) which contains, in addition to a useful spectral content corresponding to the in-phase component I-$S_2$, also an interfering spectral content $S_{int}$ corresponding to the adjacent channels $S_{ad1}$ and $S_{ad3}$.

The demodulated signal of FIG. 6a occupies a band $B_{I-Q}$ in the baseband.

Subsequently, the demodulated analog signal is converted into a digital signal by means of the converter A/D-1, at the first sampling frequency $R_S$ chosen so as to satisfy the Nyquist theorem in relation to the band $B_{I-Q}$.

Figure 6B:
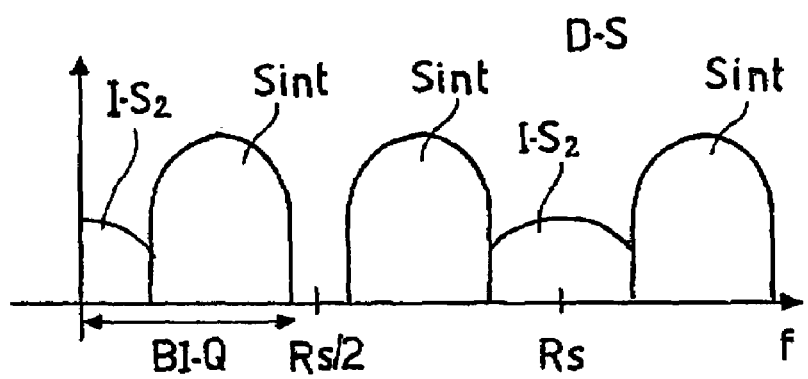

FIG. 6b shows the spectrum of the digital signal D-S resulting from the conversion and including replicas centered on multiples of the first sampling frequency $R_S$.

The digital signal D-S is then sent to the low-pass digital filter DLPF which processes it so as to attenuate the interfering spectral content.

Preferably, the low-pass digital filter DLPF is such as to attenuate the power of the interfering signal by a quantity greater than 18 dB, for example, of between 18 dB and 35 dB. According to a particular example, the digital filter DLPF, which is realized with an FIR filter having 128 taps and a 1 dB, 2.5 MHz, unilateral band, is able to achieve an attenuation in the power of the interfering signal greater than 20 dB.

More preferably, the low-pass digital filter DLPF is such as to attenuate the power of the interfering signal by a quantity greater than 23 dB, for example, ranging between 23 dB and 35 dB. According to a further particular example, the digital filter DLPF, which is realized with an FIR filter having 256 taps and a 1 dB, 2.3 MHz, unilateral band, is able to obtain an attenuation in the power of the interfering signal greater than 25 dB.

Figure 6C:
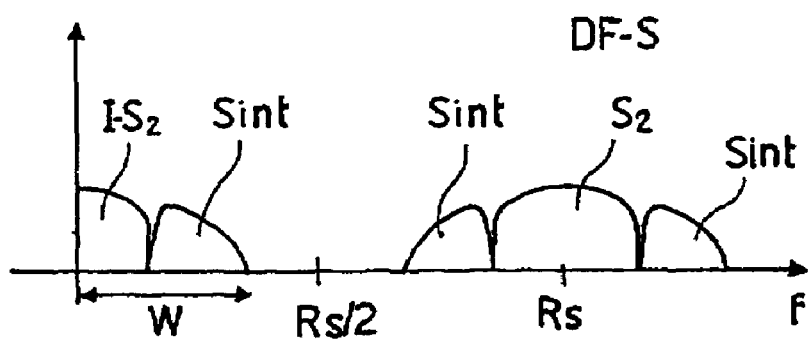

FIG. 6c shows the spectrum of the filtered digital signal DF-S comprising replicas in which the spectral content $S_{int}$ is attenuated considerably with respect to the signal I-S2. Owing to the action of the digital low-pass filter DLPF, the baseband component of the filtered digital signal FD-S has an occupied band W which is smaller than that $B_{I-Q}$ prior to digital filtering. This filtered digital signal has a first bit rate $R_b$, for example, equal to 420 Mbit/s.

Subsequently, the filtered digital signal DF-S is sent to the sampling frequency reducer SRR which samples it at a second frequency $R_S'$ which satisfies the Nyquist theorem with regard to the occupied band W ($R_S' \geq 2W$).

Figure 6D:
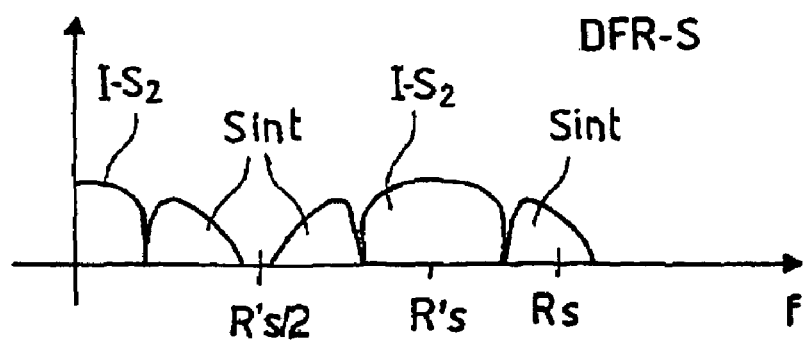

FIG. 6d shows the spectrum of the digital signal at a reduced sampling frequency DFR-S to which a second bit rate $R_b'$ less than the first bit rate $R_b$ corresponds.

It is pointed out that, for the quadrature component Q-$S_2$, considerations which are entirely similar to those relating to the in-phase component I-$S_2$ are applicable.

Then, the signal supplied from the in-phase component I-$S_2$ thus processed is multiplexed, by the multiplexer MUX-a, with the digital signal resulting from the sampling frequency reduction corresponding to the quadrature component Q-$S_2$ and is multiplexed with the digital signals relating to other transmission signals $S_1$-$S_n$ processed in the same antenna unit AU1. The overall digital flow of the parallel type which is obtained on the fourth bus PB4 is converted, by means of the converter P/S, into a serial flow. The processing block PROC-BL-A inserts the appropriate frame format and the line coding. The electrical signal output from this processing block is then sent to the electro-optical converter E/O-A which generates corresponding radiation at frequencies suitable for transportation on the optical fiber F-up1.

It is pointed out that, advantageously, the station U-RRP described above processes the signals received in uplink mode in such a way as to comply with the ACS (Adjacent Channel Selectivity) test specified by 3 GPP TS 25.141 v4.0.0 "3GPP;TSG RAN; Base station conformance testing (FDD)" (Release 1999), 3GPP 2001-03, par. 7.4.

According to the ACS test, a useful signal (such as the signal $S_2$ associated with the channel Ch2) with a predetermined power is sent to the input of a test receiver and, also, a signal (such as the signal $S_{ad3}$ associated with a channel Ch3) adjacent to the useful signal and interfering with it is sent. Then the performance of the test receiver is evaluated in relation to reception of the adjacent signal. This performance must not be less than a certain predefined threshold specified by the ACS test. Basically the BER (Bit Error Rate) is determined in the presence of a predefined signal noise ratio. For example, for a signal of the voice type at 12.2 Kbps, the test requires that the measurement should result in a BER≦0.001 with a useful signal having a power −115 dBm and adjacent signal, centered on a frequency distant 5 MHz from the carrier of the useful signal, having a power −52 dBm.

With reference to the station U-RRP described, each digital filter DLPF is such as to process the digital signal which passes through it so that the abovementioned test is complied with, reducing the level of the adjacent signal and therefore allowing transfer of a reduced band on the fiber, but avoiding any aliasing phenomena. The overall dynamic of the signal in terms of amplitude is moreover reduced, reducing it basically to that of the useful signal alone.

Figure 7:
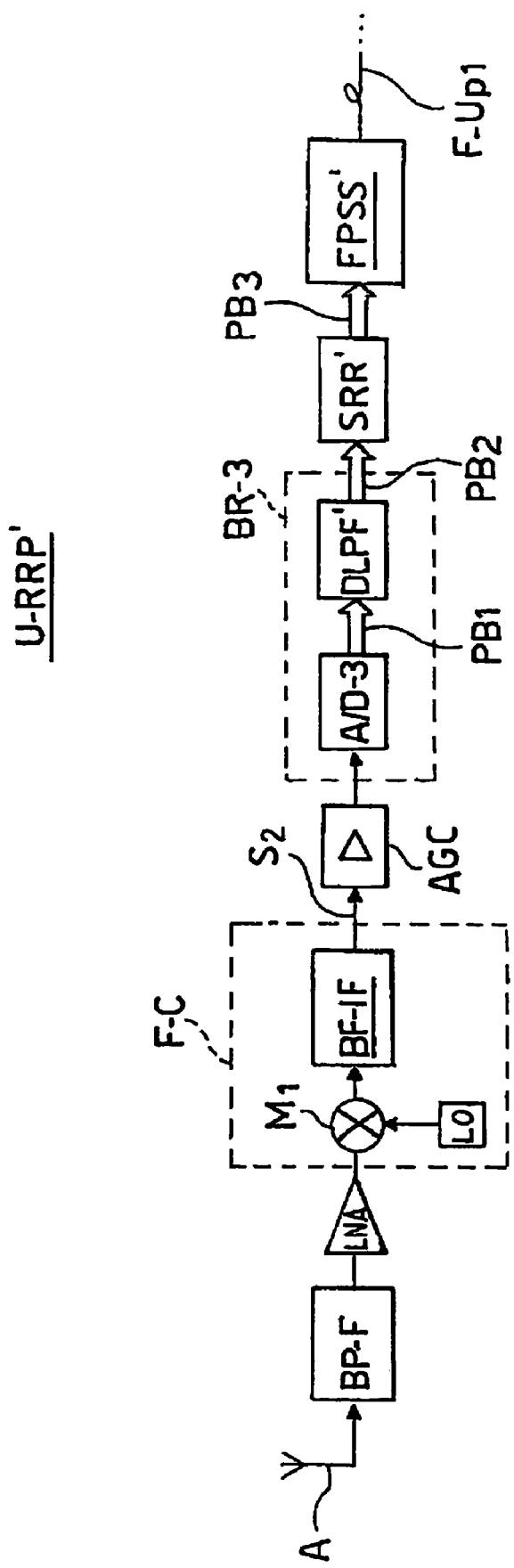
FIG. 7 shows in schematic form a second embodiment of a section of an antenna unit which can be used in the network according to FIG. 1 and is assigned for the uplink connection.

FIG. 7 shows schematically a remote radio station U-RRP' which is an alternative to the remote radio station U-RRP shown in FIG. 5. In this FIG. 7 the same reference numbers are used to indicate components which are identical or similar to those shown in the preceding figures.

This alternative remote radio station U-RRP', unlike the station shown in FIG. 5, does not perform demodulation of the signal output from the controlled gain amplifier AGC, but directly processes the modulated signal.

In greater detail, in this alternative remote radio station U-RRP', the output of the frequency conversion stage F-C is connected (by means of the controlled gain amplifier AGC) to a third processing branch BR-3 similar to one of the two processing branches BR-1 and BR-2, described in detail with reference to FIG. 5. In particular, this third processing branch BR-3 comprises a third analog-digital converter A/D-3 for performing an analog-digital conversion of the modulated and intermediate frequency signals output from the frequency conversion stage F-C. The third converter A/D-3 may be of a type similar to the first and the second converter A/D-1 and A/D-2 and is such as to perform sampling at the frequency $2*R_S$ since it is intended to process the intermediate frequency IF signal.

The third processing branch BR-3 also includes a low-pass digital filter DLPF' connected at its output to the third analog-digital converter A/D-3 and followed by an additional sampling frequency reducer SRR'.

The low-pass digital filter DLPF' and the reducer SRR' of the alternative remote station SRR' are similar to the digital filters DLPF and to the reducer SRR described above, but, unlike the latter, are such as to process signals not in the baseband but at intermediate frequency.

The third output bus PB3 of the sampling frequency reducer SRR' is connected to an additional final processing substation FPSS' which is similar to the substation FPSS of FIG. 5 and therefore not shown in detail.

Operation of the remote radio station U-RRP' according to FIG. 7 is similar to that of the remote radio station U-RRP according to FIG. 5 illustrated above.

In this case, the digital filter DLPF of the third processing branch BR-3 has at its input an analog signal which contains, in addition to the useful spectral content of the (intermediate frequency) signal $S_2$, also the interfering spectral content $S_{int}$ corresponding to the adjacent channels $S_{ad1}$ and $S_{ad3}$. The subsequent processing of the signals $S_2$ and $S_{int}$ performed by the digital filter DLPF' and the frequency reducer SRR' of the alternative remote station RRP' may be easily deduced from the above description relating to FIGS. 6a-6d, replacing the in-phase component $I-S_2$ with the entire intermediate frequency signal $S_2$ (and adapting the values of the sampling and subsampling frequencies).

The intermediate frequency signal $S_2$ digitized at the sampling frequency $2*R_S$, filtered by the interfering signal $S_{int}$ and converted to the sampling frequency $2*R_S'$ is then processed by the substation FPSS' so as to be sent to the central unit CUi by means of the optical fiber F-up1.

The mobile radio communications network in accordance with the invention has numerous advantages in addition to those mentioned above with regard to separation of the specific functions among the base station processing sections BSPP1-BSPP$_N$ and the antenna units AU1-AU10.

In fact, as a result of the teachings of the invention it is possible to obtain the required rejection of the interfering signals associated with the adjacent channels, avoiding the need to use high-selectivity analog filters which are difficult to implement and have high costs.

In accordance with the invention, the filtering which plays a greater part in attenuation of the interfering signals is performed by means of digital filters which can be realized at a lower cost than that of analog filters, but are such as to offer satisfactory results and, in particular, such as to comply with the standards which define the performance of receivers in relation to adjacent channels.

Moreover, as a result of the reduction in the sampling frequency effected on the signal output from the digital filter, it is possible to limit the band occupied by each channel on the waveguide link (for example, an optical fiber), allowing an increase in the number of antenna units which can be served by a same connection, both of the ring and star type.

It should be noted that, as mentioned above, the reduction in the bit rate described above also has the advantage of allowing use of STM-N frames (preferably the frame STM-4) with which not particularly complex and costly components are associated.

In particular, the network 1 according to FIG. 1, using according to a preferred example, the transmission on optical fiber (for example, the fibers FO1, FO2) of digital signals has advantages associated with the fact that the digital signals are less subject to the degradation due to attenuation in the fiber and dispersion within the fiber than analog signals.

The invention claimed is:

1. A station for processing a first signal which can be generated by a mobile terminal and belongs to a plurality of signals for mobile radio communications networks, comprising:
   an input able to receive from an antenna the first signal associated with a first band and at least one adjacent signal of said plurality associated with a second band adjacent to that of the first signal;
   a processing stage for generating from the first signal and from the at least one adjacent signal a first digital signal at a first sampling frequency, this first digital signal including a useful spectral content of the first signal and an interfering spectral content associated with said adjacent signal;
   a digital filter for processing the first digital signal, attenuating the interfering spectral content, and for providing a filtered digital signal including at least part of said useful spectral content; and
   a converter for generating from said filtered digital signal electromagnetic radiation to be transmitted on a waveguide.

2. The station according to claim 1, further comprising a sampling frequency reducer connected to said digital filter for generating a second digital signal having a second sampling frequency lower than said first frequency.

3. The station according to claim 2, wherein the sampling frequency reducer comprises:
an anti-aliasing digital filter for filtering said filtered digital signal and having a cut-off frequency substantially equal to half of said second sampling frequency; and
a decimator for sampling a digital signal output from the anti-aliasing digital filter at said second sampling frequency.

4. The station according to claim 1, wherein the processing stage comprises an analog filter having a passband such as to eliminate second signals of said plurality which are non-adjacent to the first signal and transmit a first electrical signal having said useful spectral content and said interfering spectral content.

5. The station according to claim 4, wherein said analog filter is a Chebyshey filter of $3^{rd}$ to $7^{th}$ order.

6. The station according to claim 5, wherein said first sampling frequency is greater than or equal to double said passband of the analog filter.

7. The station according to claim 4, further comprising a demodulator connected to said analog filter for demodulating the first electrical signal and generating at least one demodulated electrical signal associated with a third band and including at least portions of the useful spectral content of the first signal and the interfering spectral content of the adjacent signal.

8. The station according to claim 7, wherein said first sampling frequency is greater than or equal to double said third band of the demodulated electrical signal.

9. The station according to claim 4, wherein said processing stage also comprises an analog-digital converter for converting an additional electrical signal correlated to the first electrical signal into said first digital signal.

10. The station according to claim 1, wherein said digital filter is an FIR filter with a number of taps such as to allow attenuation of the interfering spectral content.

11. A method for processing a first signal which can be generated by a mobile terminal and belongs to a plurality of signals for mobile radio communications networks comprising the steps of:
receiving the first signal and second signals of said plurality including at least one signal adjacent to the first signal and interfering with the latter;
performing analog filtering of a first electrical signal corresponding to said first signal and to said second signals in order to eliminate the signals of said plurality which are non-adjacent to the first signal and transmit a second electrical signal having a useful spectral content associated with the first signal and an interfering spectral content associated with the adjacent signal;
converting from analog to digital the filtered first electrical signal so as to generate a digital signal, said conversion occurring at a first sampling frequency and defining a first transmission rate of said first digital signal;
performing digital filtering of the first digital signal in order to eliminate substantially the interfering spectral content and provide a first filtered digital signal including said useful spectral content; and
reducing the sampling frequency of said first filtered digital signal so as to obtain a second filtered digital signal to be sent on a first output bus and having a second transmission rate less than the first transmission rate.

12. The method according to claim 11, further comprising the steps of:
converting an electrical signal correlated to said first filtered digital signal into electromagnetic radiation; and
transmitting said electromagnetic radiation on a waveguide.

13. The method according to claim 12, further comprising the steps of:
before said electrical to optical conversion step, performing a conversion, from parallel to serial, of the second filtered digital signal; and
processing the second serialized digital signal so as to generate a corresponding electrical signal in accordance with a transmission protocol relating to said optical waveguide.

14. The method according to claim 11, further comprising a step of multiplexing on a second output bus the second filtered digital signal with additional digital signals associated with additional signals of said plurality which can be generated by additional mobile terminals.

15. A mobile radio communications network comprising:
a main control center of the network for managing a plurality of signals;
a station for processing said signals controlled by said main control center, the processing station being provided with a port for receiving/transmitting electromagnetic radiation;
a waveguide having a first end connected to said output port; and
at least one antenna station for processing a first signal which can be generated by a mobile terminal and belongs to the plurality of signals, said station being connected to a second end of the waveguide and comprising:
an input able to receive from an antenna the first signal associated with a first band and at least one adjacent signal of said plurality associated with a second band adjacent to that of the first signal;
a processing state for generating from the first signal and from at least one adjacent signal a first digital signal at a first sampling frequency, this first digital signal including a useful spectral content of the first signal and an interfering spectral content associated with said adjacent signal;
a digital filter for processing the first digital signal, attenuating the interfering spectral content, and for providing a filtered digital signal including at least part of said useful spectral content; and
a converter for generating from said filtered digital signal electromagnetic radiation to be transmitted to the processing station by means of the waveguide.

16. The mobile radio communications network according to claim 15, further comprising a sampling frequency reducer connected to said digital filter for generating a second digital signal having a sampling frequency lower than said first frequency.

17. The mobile radio communications network according to claim 15, wherein said processing station includes processing apparatus for coding/decoding voice or data signals to be sent/received to/from said at least one antenna station.

18. The mobile radio communications network according to claim 17, wherein said processing station also includes a block for processing signals supplied from said apparatus so as to make them compliant with the modes of transportation on said waveguide.

19. The mobile radio communications network according to claim 17, wherein a Synchronous Digital Hierarchy standard is used for transportation on said waveguide.

20. The mobile radio communications network according to claim 15, wherein additional antenna stations provided with respective antennas are connected to said waveguide.

21. The mobile radio communications network according to claim 20, wherein said waveguide forms a point-to-point link.

22. The mobile radio communications network according to claim 20, wherein said waveguide forms a ring connection between said antenna stations.

23. The mobile radio communications network according to claim 15, which operates by using a system of the Universal Mobile Telecommunication System type.

24. The mobile radio communications network according to claim 15, wherein said waveguide is an optical fiber.

* * * * *